(12) United States Patent
Hsu et al.

(10) Patent No.: US 9,369,865 B2
(45) Date of Patent: Jun. 14, 2016

(54) METHOD, APPARATUS, AND COMPUTER READABLE MEDIUM FOR PROVIDING WIRELESS DEVICE PROTECTION SERVICE

(71) Applicant: Assurant, Inc., New York, NY (US)

(72) Inventors: Brian Paul-ang Hsu, Atlanta, GA (US); William David Crossett, West Chester, PA (US)

(73) Assignee: Assurant, Inc., New York, NY (US)

( * ) Notice: Subject to any disclaimer, the term of this patent is extended or adjusted under 35 U.S.C. 154(b) by 94 days.

(21) Appl. No.: 14/286,491

(22) Filed: May 23, 2014

(65) Prior Publication Data

US 2014/0349615 A1    Nov. 27, 2014

Related U.S. Application Data

(60) Provisional application No. 61/827,362, filed on May 24, 2013, provisional application No. 61/827,914, filed on May 28, 2013.

(51) Int. Cl.
  *H04W 12/02*    (2009.01)
  *H04W 12/00*    (2009.01)
  *H04L 29/06*    (2006.01)

(52) U.S. Cl.
  CPC .............. *H04W 12/02* (2013.01); *H04L 63/20* (2013.01); *H04W 12/00* (2013.01)

(58) Field of Classification Search
  CPC ....... H04W 12/02; H04W 12/00; H04L 63/20
  See application file for complete search history.

(56) References Cited

U.S. PATENT DOCUMENTS

| 7,756,515 | B1 | 7/2010 | Soelberg et al. | |
|---|---|---|---|---|
| 2008/0127313 | A1* | 5/2008 | Payne et al. | 726/5 |
| 2012/0029947 | A1* | 2/2012 | Wooldridge et al. | 705/4 |
| 2012/0252403 | A1 | 10/2012 | Becerra et al. | |

OTHER PUBLICATIONS

International Search Report and Written Opinion from International Application No. PCT/US2014/039391, received Oct. 14, 2014.

* cited by examiner

*Primary Examiner* — Brandon Miller
(74) *Attorney, Agent, or Firm* — Alston & Bird LLP (57) ABSTRACT

Provided herein are systems, methods and computer readable media for programmatically providing wireless device protection services. An example method includes receiving, from a first wireless device, a subscriber identifier associated with a wireless device subscriber identification module, determining, using a processor, whether the subscriber identifier is associated with a wireless device protection plan, in response to determining that the subscriber identifier is associated with the wireless device protection plan, determining whether the first wireless device is eligible for the wireless device protection plan, and, in response to determining that the first wireless device is eligible for the wireless device protection plan, registering the first wireless device with the wireless device protection plan to provide services associated with the wireless device protection plan for the first wireless device.

23 Claims, 5 Drawing Sheets

METHOD, APPARATUS, AND COMPUTER READABLE MEDIUM FOR PROVIDING WIRELESS DEVICE PROTECTION SERVICE

CROSS-REFERENCE TO RELATED APPLICATIONS

This non-provisional application claims the benefit of U.S. Provisional Patent Application No. 61/827,362, filed May 24, 2013, and U.S. Provisional Patent Application No. 61/827,914, filed May 28, 2013, the entire contents of which are hereby incorporated by reference.

FIELD

Embodiments of the invention relate, generally, to providing wireless device protection services and, more particularly, to methods, apparatuses, and computer readable media for offering, validating, and verifying wireless devices for protection services based on a subscriber identity module.

BACKGROUND

Applicant has discovered problems with current methods for offering wireless device protection services. Through applied effort, ingenuity, and innovation, Applicant has solved many of these identified problems by developing a solution that is embodied by the present invention, which is described in detail below.

BRIEF SUMMARY

In general, embodiments of the present invention provide herein systems, methods and computer readable media for offering, processing, maintaining, validating, and verifying wireless device protection services to customers using wireless devices with incorporated subscriber identity modules.

Embodiments may include a method for providing wireless device protection services. The method includes receiving, from a first wireless device, a subscriber identifier associated with a wireless device subscriber identification module, determining, using a processor, whether the subscriber identifier is associated with a wireless device protection plan, in response to determining that the subscriber identifier is associated with the wireless device protection plan, determining whether the first wireless device is eligible for the wireless device protection plan, and in response to determining that the first wireless device is eligible for the wireless device protection plan, registering the first wireless device with the wireless device protection plan to provide services associated with the wireless device protection plan for the first wireless device. In some embodiments, determining whether the first wireless device is eligible for the wireless device protection plan may include determining whether a device model of the first wireless device is covered by the wireless device protection plan. The method may also include determining that the device model of the first wireless device is not covered by the wireless device protection plan, in response to determining that the device model of the first wireless device is not covered by the wireless device protection plan, providing a prompt to the first wireless device to upgrade the wireless device protection plan to cover the wireless device, and in response to receiving a confirmation of an intention to upgrade the wireless device protection plan, upgrading the wireless device protection plan to provide the services of the wireless device protection plan for the first wireless device. The method may also include receiving a notification that the subscriber identification module is associated with a second wireless device, and registering the second wireless device with the wireless device protection plan to provide the services of the wireless device protection plan for the second wireless device. Some embodiments may further include verifying that the second wireless device is eligible for the wireless device protection plan prior to registering the second wireless device with the wireless device protection plan. Embodiments may also include revoking the registration of the first wireless device in response to registering the second wireless device.

Embodiments of the method may also include validating the functionality of the first wireless device prior to registering the wireless device with the wireless device protection plan. The first wireless device may be registered with the wireless device protection plan further in response to a successful validation. In response to a failure of validation of the first wireless device, embodiments of the method may impose a waiting period on the wireless device protection plan such that at least a portion of the services associated with the wireless device protection plan are unavailable until expiration of the waiting period. Validating the functionality may include at least one of verifying the functionality of a display of the first wireless device, a microphone of the first wireless device, a keypad of the first wireless device, a touchscreen of the first wireless device, a speaker of the first wireless device, or the ability of the first wireless device to receive a call.

The subscriber identification module may be a Subscriber Identity Module (SIM) card. The wireless device protection plan may be at least one of a device warranty, a device insurance policy, or a device technical support plan. The wireless device protection plan may cover one or more of loss, theft, or accidental damage.

Embodiments may also include an apparatus for providing wireless device protection services. The apparatus includes at least one processor coupled to a memory. The memory includes computer executable instructions that, when executed by the processor, configure the apparatus. The instructions configure the apparatus to receive, from a first wireless device, a subscriber identifier associated with a wireless device subscriber identification module, determine whether the subscriber identifier is associated with a wireless device protection plan, in response to determining that the subscriber identifier is associated with the wireless device protection plan, determine whether the first wireless device is eligible for the wireless device protection plan, and in response to determining that the first wireless device is eligible for the wireless device protection plan, register the first wireless device with the wireless device protection plan to provide services associated with the wireless device protection plan for the first wireless device. Determining whether the first wireless device is eligible for the wireless device protection plan may include determining whether a device model of the first wireless device is covered by the wireless device protection plan. The apparatus may be further configured to determine that the device model of the first wireless device is not covered by the wireless device protection plan, in response to determining that the device model of the first wireless device is not covered by the wireless device protection plan, provide a prompt to the first wireless device to upgrade the wireless device protection plan to cover the wireless device, and in response to receiving a confirmation of an intention to upgrade the wireless device protection plan, upgrade the wireless device protection plan to provide the services of the wireless device protection plan for the first wireless device.

In some embodiments, the apparatus is further configured to receive a notification that the subscriber identification module is associated with a second wireless device, and register the second wireless device with the wireless device protection plan to provide the services of the wireless device protection plan for the second wireless device. The apparatus may also be configured to verify that the second wireless device is eligible for the wireless device protection plan prior to registering the second wireless device with the wireless device protection plan. Embodiments of the apparatus may be further configured to revoke the registration of the first wireless device in response to registering the second wireless device. The apparatus may be further configured to validate the functionality of the first wireless device prior to registering the wireless device with the wireless device protection plan. The first wireless device may be registered with the wireless device protection plan further in response to a successful validation. In yet further embodiments, the apparatus may be configured to, in response to a failure of validation of the first wireless device, impose a waiting period on the wireless device protection plan such that at least a portion of the services associated with the wireless device protection plan are unavailable until expiration of the waiting period. Validating the functionality may include at least one of verifying the functionality of a display of the first wireless device, a microphone of the first wireless device, a keypad of the first wireless device, a touchscreen of the first wireless device, a speaker of the first wireless device, or the ability of the first wireless device to receive a call. The subscriber identification module may be a Subscriber Identity Module (SIM) card. The wireless device protection plan may be at least one of a device warranty, a device insurance policy, or a device technical support plan. The wireless device protection plan may cover one or more of loss, theft, or accidental damage.

Embodiments may provide a non-transitory computer readable storage medium comprising instructions that, when executed by a processor, configure the processor. The instructions configure the processor to receive, from a first wireless device, a subscriber identifier associated with a wireless device subscriber identification module, determine whether the subscriber identifier is associated with a wireless device protection plan, in response to determining that the subscriber identifier is associated with the wireless device protection plan, determine whether the first wireless device is eligible for the wireless device protection plan, and, in response to determining that the first wireless device is eligible for the wireless device protection plan, register the first wireless device with the wireless device protection plan to provide services associated with the wireless device protection plan for the first wireless device. Determining whether the first wireless device is eligible for the wireless device protection plan may include determining whether a device model of the first wireless device is covered by the wireless device protection plan. In some embodiments the instructions further configuring the processor to determine that the device model of the first wireless device is not covered by the wireless device protection plan, in response to determining that the device model of the first wireless device is not covered by the wireless device protection plan, provide a prompt to the first wireless device to upgrade the wireless device protection plan to cover the wireless device, and, in response to receiving a confirmation of an intention to upgrade the wireless device protection plan, upgrade the wireless device protection plan to provide the services of the wireless device protection plan for the first wireless device. In some embodiments, the instructions further configure the processor to receive a notification that the subscriber identification module is associated with a second wireless device, and register the second wireless device with the wireless device protection plan to provide the services of the wireless device protection plan for the second wireless device. In yet further embodiments, the instructions further configure the processor to verify that the second wireless device is eligible for the wireless device protection plan prior to registering the second wireless device with the wireless device protection plan. The instructions may further configure the processor to revoke the registration of the first wireless device in response to registering the second wireless device.

In some embodiments, the instructions further configure the processor to validate the functionality of the first wireless device prior to registering the wireless device with the wireless device protection plan. The first wireless device may be registered with the wireless device protection plan further in response to a successful validation. The instructions may further configure the processor to, in response to a failure of validation of the first wireless device, impose a waiting period on the wireless device protection plan such that at least a portion of the services associated with the wireless device protection plan are unavailable until expiration of the waiting period. Validating the functionality may include at least one of verifying the functionality of a display of the first wireless device, a microphone of the first wireless device, a keypad of the first wireless device, a touchscreen of the first wireless device, a speaker of the first wireless device, or the ability of the first wireless device to receive a call.

The subscriber identification module may be a Subscriber Identity Module (SIM) card. The wireless device protection plan may be at least one of a device warranty, a device insurance policy, or a device technical support plan. The wireless device protection plan may cover one or more of loss, theft, or accidental damage.

Additional embodiments may provide another method for providing wireless device protection services. This method includes providing, by a first wireless device, a subscriber identifier associated with a subscriber identification module, receiving an offer for a wireless device protection plan in response to providing the subscriber identifier, accepting the offer for the wireless device protection plan, thereby enabling coverage of the first wireless device by the wireless device protection plan, providing, by a second wireless device, the subscriber identifier using the subscriber identification module, and in response to providing the subscriber identifier by the second wireless device, receiving coverage of the second wireless device under the wireless device protection plan.

Yet further embodiments may provide an additional method for providing wireless device protection services. This method includes detecting, by a first wireless device, a change in a subscriber identification module, in response to detecting the change in the subscriber identification module, providing a notification of the change in the subscriber identification module, and, in response to providing the notification and based on a subscriber identifier indicated by the subscriber identification module, receiving coverage of the first wireless device under a wireless device protection plan associated with the subscriber identification module. The method may also include activating the first wireless device on a wireless network using an authentication credential provided by the subscriber identification module. The wireless device protection plan may be at least one of a device warranty, a device insurance policy, or a device technical support plan. Embodiments of the method may also include validating the functionality of the first wireless device. Coverage of the first wireless device may be further received in response to a successful validation of the functionality of the first wireless device. The subscriber identification module may be previously associated with a second wireless device, and the wireless device protection plan may cover the second wireless device. Receiving coverage of the first wireless device may include a revocation of coverage of the second wireless device under the wireless device protection plan.

Further embodiments may include another apparatus for providing wireless device protection services. The apparatus includes at least one processor coupled to a memory. The memory includes computer executable instructions that, when executed by the processor, configure the apparatus. The computer executable instructions configure the apparatus to detect a change in a subscriber identification module associated with the apparatus, in response to detecting the change in the subscriber identification module, provide a notification of the change in the subscriber identification module, and, in response to providing the notification and based on a subscriber identifier indicated by the subscriber identification module, receive coverage of the apparatus under a wireless device protection plan associated with the subscriber identification module. The apparatus may be further configured to activate the apparatus on a wireless network using an authentication credential provided by the subscriber identification module. The wireless device protection plan may be at least one of a device warranty, a device insurance policy, or a device technical support plan. The apparatus may be further configured to validate the functionality of the apparatus, and coverage of the first wireless device may be further received in response to a successful validation of the functionality of the apparatus. The subscriber identification module may be previously associated with a second wireless device other than the apparatus, and the wireless device protection plan may cover the second wireless device. Receiving coverage of the apparatus may include a revocation of coverage of the second wireless device under the wireless device protection plan.

Embodiments may include another non-transitory computer readable storage medium comprising instructions that, when executed by a processor, configure the processor to provide wireless device protection services. The instructions configure the processor to detect a change in a subscriber identification module associated with a first wireless device, in response to detecting the change in the subscriber identification module, provide a notification of the change in the subscriber identification module, and in response to providing the notification and based on a subscriber identifier indicated by the subscriber identification module, receive coverage of the first wireless device under a wireless device protection plan associated with the subscriber identification module. The instructions may further configure the processor to activate the first wireless device on a wireless network using an authentication credential provided by the subscriber identification module. The wireless device protection plan may be at least one of a device warranty, a device insurance policy, or a device technical support plan. The instructions may further configure the processor to validate the functionality of the first wireless device, and coverage of the first wireless device may be further received in response to a successful validation of the functionality of the first wireless device. The subscriber identification module may be previously associated with a second wireless device, and the wireless device protection plan may cover the second wireless device. Receiving coverage of the first wireless device may include a revocation of coverage of the second wireless device under the wireless device protection plan.

Yet further embodiments may include another method for providing wireless device protection services. The method includes receiving, from a first wireless device, a subscriber identifier associated with a wireless device subscriber identification module, determining, using a processor, that the subscriber identifier is associated with a wireless device protection plan, determining that a second wireless device other than the first wireless device is registered with the wireless device protection plan, registering the first wireless device with the wireless device protection plan to provide services associated with the wireless device protection plan for the first wireless device, and revoking registration of the second wireless device with the wireless device protection plan. The subscriber identifier may be received in response to activation of the subscriber identification module with the first wireless device to enable the first wireless device to access a wireless network, and the subscriber identification module may have been previously activated with the second wireless device to enable the second wireless device to access the wireless network. The subscriber identification module may be a Subscriber Identity Module (SIM) card.

Additional embodiments may provide yet another apparatus for providing wireless device protection services. The apparatus includes at least one processor coupled to a memory. The memory includes computer executable instructions that, when executed by the processor, configure the apparatus. The instructions may configure the apparatus to receive, from a first wireless device, a subscriber identifier associated with a wireless device subscriber identification module, to determine that the subscriber identifier is associated with a wireless device protection plan, to determine that a second wireless device other than the first wireless device is registered with the wireless device protection plan, to register the first wireless device with the wireless device protection plan to provide services associated with the wireless device protection plan for the first wireless device, and to revoke registration of the second wireless device with the wireless device protection plan. The subscriber identifier may be received in response to activation of the subscriber identification module with the first wireless device to enable the first wireless device to access a wireless network, and the subscriber identification module may have been previously activated with the second wireless device to enable the second wireless device to access the wireless network. The subscriber identification module may be a Subscriber Identity Module (SIM) card.

Embodiments may also provide yet another non-transitory computer readable storage medium comprising instructions that, when executed by a processor, configure the processor. The instructions configure the processor to receive, from a first wireless device, a subscriber identifier associated with a wireless device subscriber identification module, to determine, using a processor, that the subscriber identifier is associated with a wireless device protection plan, to determine that a second wireless device other than the first wireless device is registered with the wireless device protection plan, to register the first wireless device with the wireless device protection plan to provide services associated with the wireless device protection plan for the first wireless device and to revoke registration of the second wireless device with the wireless device protection plan. The subscriber identifier may be received in response to activation of the subscriber identification module with the first wireless device to enable the first wireless device to access a wireless network, and the subscriber identification module may have been previously activated with the second wireless device to enable the second wireless device to access the wireless network. The subscriber identification module may be a Subscriber Identity Module (SIM) card.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Introduction and Definitions

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "subscriber identification module" should be understood to refer to any device that, when used in conjunction with a wireless device, functions to configure the wireless device to be associated with a particular identity. In some embodiments, activation of the subscriber identification module with respect to a particular wireless device may enable the wireless device to access a particular wireless network. Activation of the subscriber identification module may include any method of associating the subscriber identification module with the particular wireless device, including but not limited to insertion of the subscriber identification device into a port or receptacle of the wireless device, configuring a communication channel between the wireless device and the subscriber identification module (e.g., enabling a BlueTooth® link), or the like. The subscriber identification module may provide an authentication credential used to activate the wireless device for use with a wireless network. For example, one particular example of a subscriber identification module is a Subscriber Identity Module (SIM) card used to store an international mobile subscriber identity (IMSI) and a related key used to identify and authenticate subscribers on mobile telephony devices (such as mobile phones and computers). However, it should be understood that the subscriber identification module may encompass other devices, circuits, identifiers, and the like, implemented via hardware, software, or combinations therefore, for providing a particular identity for association with a wireless device. The particular identity may be associated with a particular user, a particular user account, a particular group of users, particular hardware equipment, or the like.

As used herein, the term "wireless device" should be understood to refer to any device that is capable of using a subscriber identification module to access a wireless network. For example, wireless devices may include, without limitation, smartphones, cellular telephones, laptops, tablet computers, netbook computers, wireless-enabled appliances, desktop computers, or the like.

As used herein, the terms "protection plan" and/or "protection service" should be understood to refer to any warranty plan, insurance plan, technical support plan, or other agreement that provides a coverage benefit for a particular wireless device. In the present context, such a protection plan may be associated with a particular user, with a particular subscriber identification module, or the like.

Overview

As technology has advanced, it has become more and more common for consumers to own wireless devices. An increasing majority of consumers in developed countries own smart phones, cellular telephones, pagers, and/or other portal communication devices. The portability of these devices provides numerous benefits to consumers. Such devices are frequently lightweight and capable of being stowed in a user's pocket or pocketbook, allowing users to bring them along wherever they travel. However, the small size and portability of such devices also has some drawbacks.

In particular, the portability and light weight of wireless devices means such devices are vulnerable to loss, theft, or damage. These devices frequently include glass screens and sensitive electronics that will stop functioning if the device is accidentally dropped or immersed in water. The light weight of some devices may result in the device's owner failing to notice if the device falls out of the owner's pocket or is otherwise misplaced. Other, less portable wireless devices, such as wireless-enabled appliances (e.g., refrigerators, washers, dryers, desktop computers) and the like, are often costly to repair or replace.

To address these concerns, consumers may be offered various protection plans to consumers to insure the wireless device against accidental damage, loss, theft, or electronic failure. These plans may be offered by device manufacturers, communication services providers (e.g., a cellular provider), or various third parties. Such plans may provide the consumer with a replacement device upon the occurrence of an event that is covered by the protection plan.

However, these plans are tied to a particular wireless device, such that if the consumer upgrades or otherwise replaces their wireless device, the coverage offered by the protection plan is tied to a device the consumer no longer uses. In order to get the maximum potential benefit from such plans, the consumer is locked into the particular wireless device for the duration of the coverage. As such, consumers may be less likely to purchase coverage since they will either not derive the maximum benefit from the coverage or they will be locked to a particular device. As the pace of wireless device development cycles increases, with new devices being released yearly or even more frequently, the drawbacks of protection plans tied to particular devices have become even more apparent. The inventors have identified these and various other problems and difficulties that occur in providing wireless device protection services to consumers.

To address these problems and other problems with the current state of the art, the inventors have developed methods, processes, systems, apparatuses, and computer readable media to provide wireless device protection services that are tied to a particular subscriber identification module, rather than a particular wireless device. In support of this goal, embodiments of the present invention function to intelligently and dynamically offer wireless device protection service to consumers for their devices based on detection of subscriber identification modules (e.g., SIM cards) in a particular wireless device. Embodiments further function to validate particular wireless devices to ensure compatibility with the plan, to verify that the consumer has sufficient coverage for a particular wireless device, to send, receive, and process coverage decisions made by the consumer, and to register and revoke registration of particular wireless devices as the consumer upgrades or otherwise changes their device. As such, embodiments of the present invention advantageously provide for improved methods of covering a wireless device such that the coverage follows a subscriber identification module, allowing the consumer to maintain their coverage without being locked into a particular wireless device.

System Architecture and Example Apparatuses

The method, apparatus, and computer program product of the present invention may be embodied by any of a variety of devices. For example, the method, apparatus, and computer program product of an example embodiment may be embodied by a networked computing device, such as a server or other network entity, configured to communicate with one or more devices, such as one or more wireless devices. Additionally or alternatively, the computing device may include fixed computing devices, such as a personal computer or a computer workstation.

Figure 1:
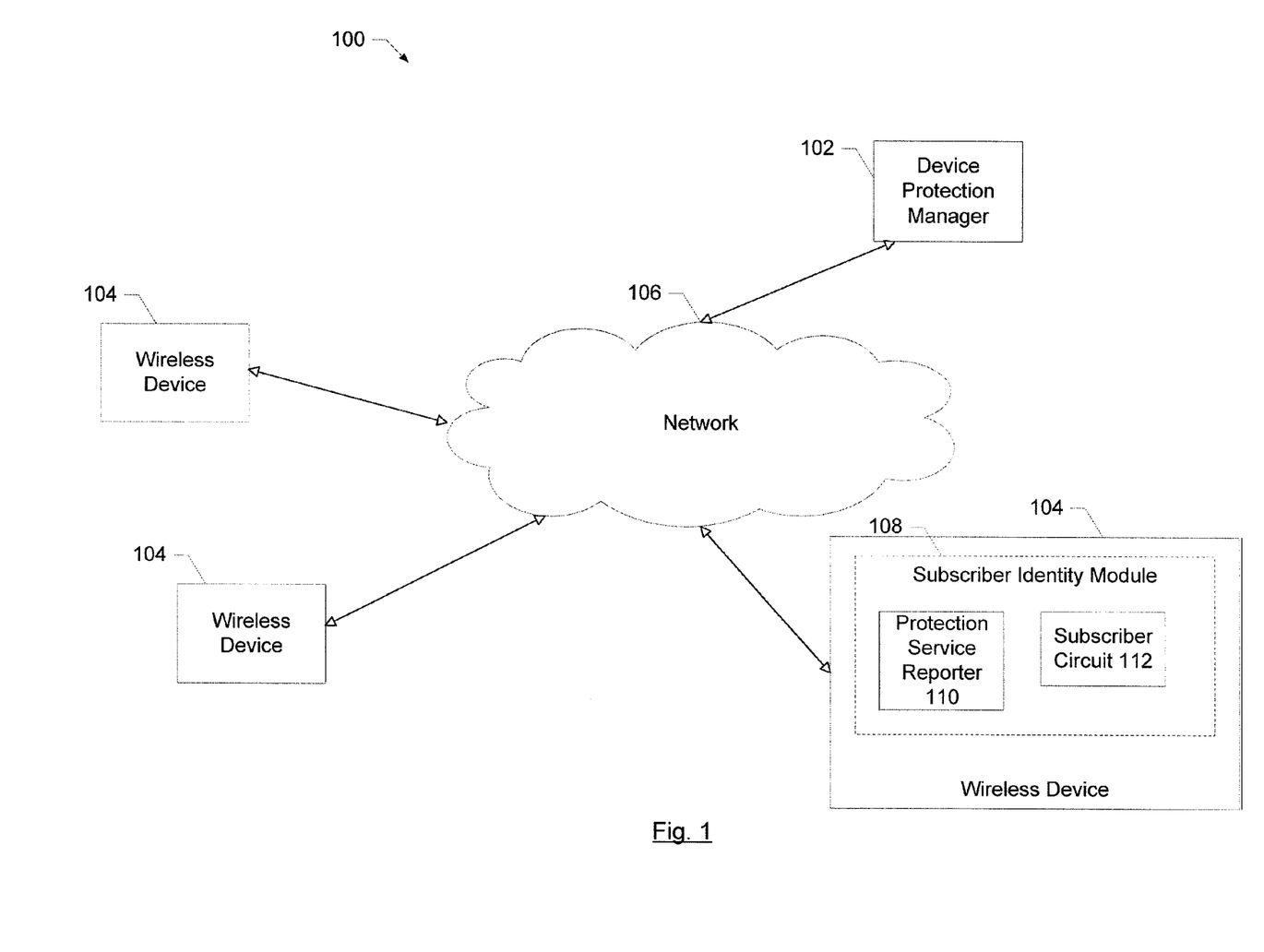
FIG. 1 depicts an example system in accordance with some embodiments described herein.

In this regard, FIG. 1 discloses an example computing environment 100 within which embodiments of the present invention may operate. One or more wireless devices 104 are in communication with a device protection manager 102 via a network 106. The device protection manager 102 functions to offer and manage protection plans for one or more of the wireless devices 104. The device protection manager 102 may also facilitate registration and/or activation of one or more of the wireless devices 104 for operation on the network 106. For example, in some embodiments the device protection manager 102 may include functionality for registering and/or activating a wireless device subscriber identification module with the network so that the wireless device 104 may communicate with other terminals or nodes on the network.

The device protection manager 102 may perform various verification and analysis functions to provide protection services to the wireless devices 104. For example, the device protection manager 102 may receive information from a wireless device 104 including the model and/or configuration of the wireless device and a user identifier associated with a subscriber identification module. The device protection manager 102 may operate to determine whether a protection plan is associated with the user identifier, and register the wireless device 104 with the protection plan such that the wireless device 104 is protected under the terms of the protection plan. The device protection manager 102 may also determine whether the wireless device 104 falls within the terms of a protection plan associated with the user identifier (e.g., the value of the device is less than or equal to a coverage limit), validate the functionality of the wireless device (e.g., ensure the wireless device is functional), and/or facilitate the upgrade or modification of coverage offered by the protection service (e.g., offering a coverage upgrade if the value of the wireless device exceeds the user's coverage limit).

The device protection manager 102 may be maintained by a wireless device protection service provider, which may, by way of example, be a wireless carrier, wireless device manufacturer, wireless device warranty provider, wireless device insurance provider, and/or other entity that may provide protection services to wireless device users.

The wireless device 104 may be embodied as any wireless computing device, such as, by way of non-limiting example, a cellular phone, smart phone, mobile communication device, tablet computing device, digital camera/camcorder, audio/video player, digital video recorder, wireless-enabled appliance, desktop computer, or the like. The wireless device 104 may include a subscriber identification module 108. The subscriber identification module 108 may function to identify and/or authenticate the wireless device 104, such as by associating the wireless device 104 with a particular account. Current subscriber devices include but are not limited to a subscriber identity module (SIM) card, smart card, a Universal Integrated Circuit Card (UICC), a removable user identity module (R-UIM), and/or the like, which may have circuits or memory related to a subscriber devices. In some embodiments, such as where the subscriber identification module 108 is embodied in a eUICC, the SIM and/or UICC may be optional as the SIM functionality may be installed on the eUICC. In some embodiments, the wireless device 104 may feature an eUICC and a SIM card and/or UICC 38 that function in concert with one another. Although some example embodiments described herein represent a subscriber identification module as a SIM card, it should be understood that the subscriber identification module 108 may include other like devices.

Some subscriber devices may be configured to report to network basic information such as wireless device identification, network operator, and the model of the wireless device to the device protection manager 102 via a network 106. In some embodiments, the subscriber identification module 108 may be a physically distinct component (e.g., a SIM card) from the wireless device that interacts with the wireless device to identify and authenticate the wireless device to a network provider. Such identification capability may be provided via a subscriber circuit 112 incorporated into the subscriber identification module 108. The subscriber identification module 108 may also include a protection service reporter 110 configured to communicate with the wireless device 104 to determine information relevant to determine a custom wireless device protection service offer and validation. The protection service reporter 110 may also report basic wireless device information (e.g., SIM card info, mobile number, wireless device ID or IMEI, network operator, etc.), to the device protection manager 102 and later report any pre-screening or diagnostic information. Although the present exemplary embodiment describes the protection service reporter 110 as a module of the subscriber identification module, it should be appreciated that the protection service reporter 110 could be embodied as various other hardware, software, or combined hardware and software solutions. For example, the protection service reporter 110 could be embodied as an "app" or application resident within a memory of the wireless device 104, and executed upon initial boot up the wireless device after adding, replacing, or activating the subscriber identification module 108. In some other embodiments, the protection service reporter 110 may be embodied as a web-based service, whereby information about the wireless device subscriber identification module 108 is provided to the device protection manager 102 by visiting a particular web page using a browser of the wireless device 104.

In embodiments where the subscriber device is a physically distinct component (i.e., a SIM card) from the wireless device, a consumer may acquire both components at the same time, as for example through purchasing from a carrier store. A consumer may also acquire each component separately but associate such components at the point-of-sale ("POS") by, for example, bringing a previously acquired component to the point-of-sale (e.g., by bringing a previously purchased SIM card to a POS in connection with the purchase of a new mobile phone). A consumer may also acquire each device separately and associate the components at a later point, for example, by swapping a new SIM card into a wireless device at some future point after purchase of the wireless device.

Figure 2:
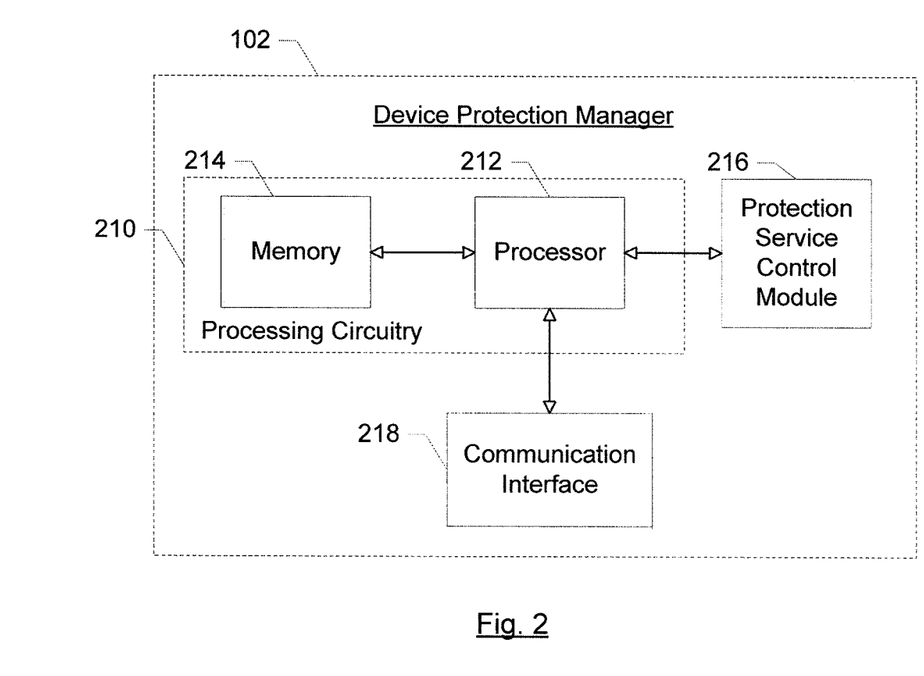
FIG. 2 depicts a schematic block diagram of circuitry that can be included in a wireless device protection management apparatus, in accordance with some embodiments described herein.

FIG. 2 illustrates a block diagram of a device protection manager 102 in accordance with some example embodiments. However, it should be noted that the components, devices or elements illustrated in and described with respect to FIG. 2 below may not be mandatory and thus some elements may be omitted in certain embodiments. Additionally, some embodiments may include further or different components, devices or elements beyond those illustrated in and described with respect to FIG. 2.

Referring now to FIG. 2, the device protection manager 102 may include or otherwise be in communication with processing circuitry 210 that is configurable to perform actions in accordance with one or more example embodiments disclosed herein. In this regard, the processing circuitry 210 may be configured to perform and/or control performance of one or more functionalities of the device protection manager 102 in accordance with various example embodiments, and thus may provide means for performing functionalities of the device protection manager 102 in accordance with various example embodiments. The processing circuitry 210 may be configured to perform data processing, application execution and/or other processing and management services according to one or more example embodiments. In some embodiments, the device protection manager 102 or a portion(s) or component(s) thereof, such as the processing circuitry 210, may be embodied as or comprise a chip or chip set. In other words, the device protection manager 102 or the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The device protection manager 102 or the processing circuitry 210 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 210 may include a processor 212 and, in some embodiments, such as that illustrated in FIG. 2, may further include memory 214. The processing circuitry 210 may be in communication with or otherwise control a communication interface 218 and/or a protection service control module 216. As such, the processing circuitry 210 may be embodied as a circuit chip (e.g., an integrated circuit chip) configured (e.g., with hardware, software or a combination of hardware and software) to perform operations described herein.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of the device protection manager 102 as described herein. The plurality of processors may be embodied on a single computing device or distributed across a plurality of computing devices collectively configured to function as the device protection manager 102. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as the device protection manager 102. The memory 214 may be configured to store information, data, applications, instructions and/or the like for enabling the device protection manager 102 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents or data sets. Among the contents of the memory 214, applications may be stored for execution by the processor 212 in order to carry out the functionality associated with each respective application. In some cases, the memory 214 may be in communication with one or more of the processor 212, communication interface 218, or protection service controller 216 via a bus(es) for passing information among components of the device protection manager 102.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information described herein can be based on data that is received, generated and/or maintained by one or more components of the device protection manager 102. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, wireless devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable the device protection manager 102 to communicate with a wireless device(s) 104 and/or other computing device via the network 106. Accordingly, the communication interface 218 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

The device protection manager also includes a protection service control module 216. This protection service control module 216 may be configured to offer, validate, and administer a wireless device protection service structured as described herein. In some embodiments, the protection service control module 216 may serve as a host for applications or other software modules which may be downloaded to wireless devices, SIM cards, and the like for supporting the activities and operations of the protection service reporter as described in connection with various embodiments. An example of a process that may be employed by the protection service control module 216 is described further below with respect to FIG. 5.

Figure 3:
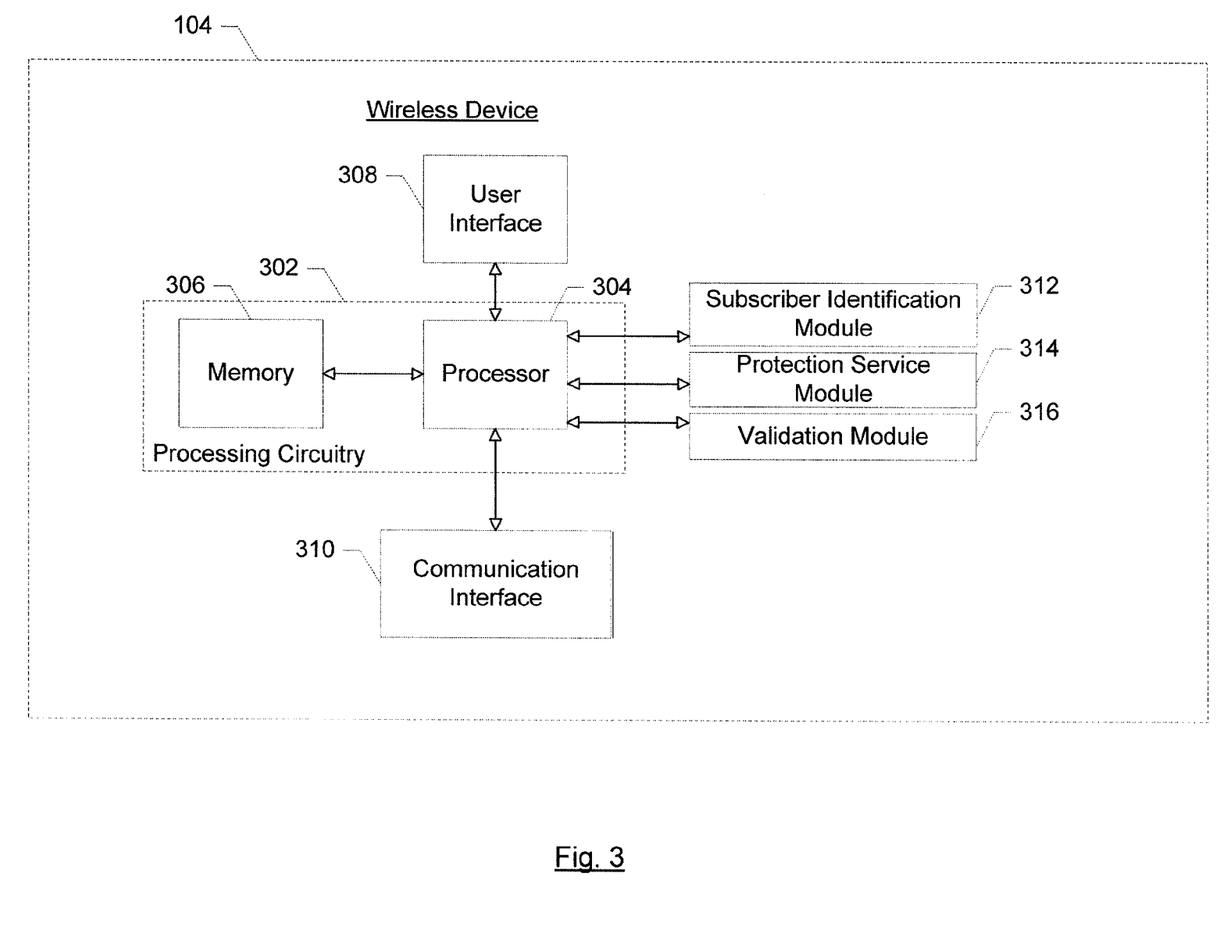
FIG. 3 depicts a schematic block diagram of circuitry that can be included in a wireless device, in accordance with some embodiments described herein.

FIG. 3 illustrates a block diagram of a wireless device 104 in accordance with some example embodiments. However, it should be noted that the components, devices or elements illustrated in and described with respect to FIG. 3 below may not be mandatory and thus some may be omitted in certain embodiments. Additionally, some embodiments may include further or different components, devices or elements beyond those illustrated in and described with respect to FIG. 3.

The wireless device 104 may include or otherwise be in communication with processing circuitry 302 that is configurable to perform actions in accordance with one or more example embodiments disclosed herein. In this regard, the processing circuitry 302 may be configured to perform and/or control performance of one or more functionalities of the wireless device 104 in accordance with various example embodiments, and thus may provide means for performing functionalities of the wireless device 104 in accordance with various example embodiments. The processing circuitry 302 may be configured to perform data processing, application execution and/or other processing and management services according to one or more example embodiments. In some embodiments, the wireless device 104 or a portion(s) or component(s) thereof, such as the processing circuitry 302, may be embodied as or comprise a chip or chip set. In other words, the wireless device 104 or the processing circuitry 302 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The wireless device 104 or the processing circuitry 302 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 302 may include a processor 304 and, in some embodiments, such as that illustrated in FIG. 3, may further include memory 306. The processing circuitry 302 may be in communication with or otherwise control a user interface 308, a communication interface 310, a protection service reporter 110 and/or subscriber circuit 112. As such, the processing circuitry 302 may be embodied as a circuit chip (e.g., an integrated circuit chip) configured (e.g., with hardware, software or a combination of hardware and software) to perform operations described herein.

The processor 304 may be embodied in a number of different ways. For example, the processor 304 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 304 may comprise a plurality of processors. The plurality of processors may be in operative communication with each other and may be collectively configured to perform one or more functionalities of the wireless device 104 as described herein. In some example embodiments, the processor 304 may be configured to execute instructions stored in the memory 306 or otherwise accessible to the processor 304. As such, whether configured by hardware or by a combination of hardware and software, the processor 304 may represent an entity (e.g., physically embodied in circuitry—in the form of processing circuitry 302) capable of performing operations according to embodiments of the present invention while configured accordingly. Thus, for example, when the processor 304 is embodied as an ASIC, FPGA or the like, the processor 304 may be specifically configured hardware for conducting the operations described herein. Alternatively, as another example, when the processor 304 is embodied as an executor of software instructions, the instructions may specifically configure the processor 304 to perform one or more operations described herein.

In some example embodiments, the memory 306 may include one or more non-transitory memory devices such as, for example, volatile and/or non-volatile memory that may be either fixed or removable. In this regard, the memory 306 may comprise a non-transitory computer-readable storage medium. It will be appreciated that while the memory 306 is illustrated as a single memory, the memory 306 may comprise a plurality of memories. The memory 306 may be configured to store information, data, applications, instructions and/or the like for enabling the wireless device 104 to carry out various functions in accordance with one or more example embodiments. For example, the memory 306 may be configured to buffer input data for processing by the processor 304. Additionally or alternatively, the memory 306 may be configured to store instructions for execution by the processor 304. As yet another alternative, the memory 306 may include one or more databases that may store a variety of files, contents or data sets. Among the contents of the memory 306, applications may be stored for execution by the processor 304 in order to carry out the functionality associated with each respective application. In some cases, the memory 306 may be in communication with one or more of the processor 304, user interface 308, communication interface 310, subscriber identification module 312, a protection service module 314, and/or a validation module 316 via a bus(es) for passing information among components of the wireless device 104.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of the wireless device 104. In some embodiments, one or more external systems (such as a remote cloud computing and/or data storage system) may also be leveraged to provide at least some of the functionality discussed herein.

The user interface 308 may be in communication with the processing circuitry 302 to receive an indication of a user input at the user interface 308 and/or to provide an audible, visual, mechanical or other output to the user. As such, the user interface 308 may include, for example, a keyboard, a mouse, a joystick, a display, a touch screen display, a microphone, a speaker, and/or other input/output mechanisms. As such, the user interface 308 may, in some example embodiments, provide means for a user to access and interact with wireless device protection services provided by the device protection manager 102 in accordance with various example embodiments.

The communication interface 310 may include one or more interface mechanisms for enabling communication with other devices and/or networks. In some cases, the communication interface 310 may be any means such as a device or circuitry embodied in either hardware, or a combination of hardware and software that is configured to receive and/or transmit data from/to a network and/or any other device or module in communication with the processing circuitry 302. By way of example, the communication interface 310 may be configured to enable the wireless device 104 to communicate with the device protection manager 102 and/or other computing device via the network 106. Accordingly, the communication interface 310 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

In some example embodiments, the processor 304 (or the processing circuitry 302) may be embodied as, include, or otherwise control or be in communication with a subscriber identification module 312. The subscriber identification module may be a subscriber identification module 108 as described above with respect to FIG. 1. As such, the subscriber identification module 312 may be embodied as various means, such as circuitry, hardware, a computer program product comprising computer readable program instructions stored on a computer readable medium (for example, the memory 306) and executed by a processing device (for example, the processor 304), or some combination thereof. The subscriber identification module 312 may function to identify a particular subscriber identifier or account associated with the subscriber identification module 312 for configuring the wireless device 104 to operate on a particular network, such as a cellular network. For example, a user account may be associated with a particular subscriber identification module 312 which is inserted or otherwise in communication with a user wireless device. If the user purchases a new or replacement wireless device, the new wireless device may be associated with the user's account by inserting the subscriber identification module into the new device to indicate to a particular network that the wireless device is now associated with the particular user account and should be activated on the network.

The wireless device 104 may further include a protection service module 314. The protection service module 314 may be implemented as a hardware, software, or combination thereof that is operable to determine whether the subscriber identification module 312 is associated with a wireless device protection service, and to communicate with a device protection manager service or server to manage the wireless device protection service. The protection service module 314 may be operable to identify a particular subscriber identifier using the subscriber identification module, and to communicate the subscriber identifier and/or additional information to the device protection manager to determine whether the subscriber identifier is associated with a protection plan.

The protection service module 314 may be further configured to offer protection coverage to the user of the wireless device, to register a new wireless device with the protection plan, to determine whether the wireless device is covered according to a particular protection plan, or the like. In some embodiments, the protection service module 314 is included as software stored and/or resident on a subscriber identification module 312. Additionally or alternatively, the protection service module 314 may be implemented as a web-based application, as an application downloaded to the memory 306 of the wireless device, or the like. The protection service module 314 may also function to enable or trigger a validation process for the wireless device 104, which may include one or more tests and/or diagnostics performed by a validation module. The protection service module 314 may also provide an interface allowing a user of the wireless device to request and/or accept an offer of a wireless device protection plan. The protection service module 314 may receive input indicating a desire by the user to purchase, upgrade, modify, or cancel a wireless device protection plan, and transmit a notification indicating as such to a device protection manager. An example method that may be employed by the protection service module 314 to manage a protection service associated with the subscriber identification module is described further below with respect to FIG. 4.

The wireless device 104 may further comprise a validation module 316. The validation module 316 may function to determine the functional characteristics of the wireless device 104 before the wireless device is registered with a particular protection plan. For example, the validation module 316 may determine that the wireless device 104 is in good working order, including but not limited to verification that the display of the wireless device is functional, that the wireless device is capable of sending and receiving telephone calls, that the wireless device has a functional microphone, and/or the like. In this manner, the validation module 316 may function to reduce false or erroneous claims by verifying that the wireless device is functional before it is covered by a protection plan. In some embodiments, the validation module 316 may receive input from a user to assist with validation operations. For example, the validation module 316 may display text at different locations on a display and request the user to input the text, in order to verify that the entire display is functional.

The depicted protection service reporter 110 may be configured to collect certain information from the wireless device and to transmit such information to the network 106 and ultimately to the device protection manager 102. In some embodiments, the protection service reporter 110 collects and reports information to the network. Upon installation or activation of a new subscriber identification module into a wireless device, the protection service reporter 110 may collect and report wireless device information such as a mobile number, a wireless device identifier or international mobile equipment identity (IMEI), a network operator, or the like. Once a user accepts an offer for a wireless device protection service, the protection service reporter 110 may collect and report wireless device setting, operation, and diagnostic information indicative of whether the devices has the ability to make calls, the operational status of the speakers, the operational status of the microphone, network connectivity status information, screen damage, charger operational status, whether the wireless device is rooted, and other similar hardware or software operational status information.

Example Processes

Figure 4:
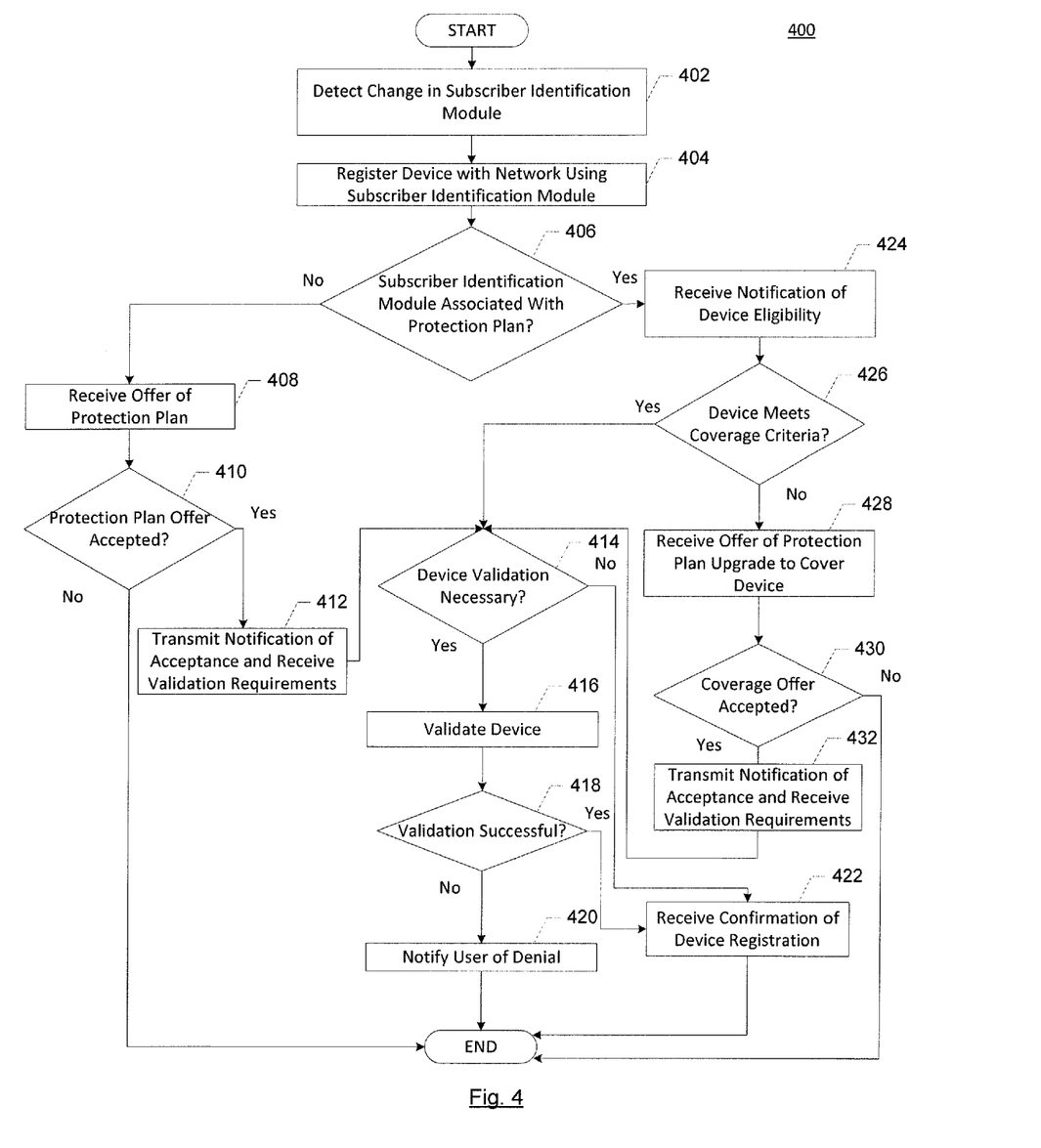
FIGS. 4-5 depict flow charts showing exemplary processes for providing wireless device protection in accordance with some embodiments described herein.
Figure 5:
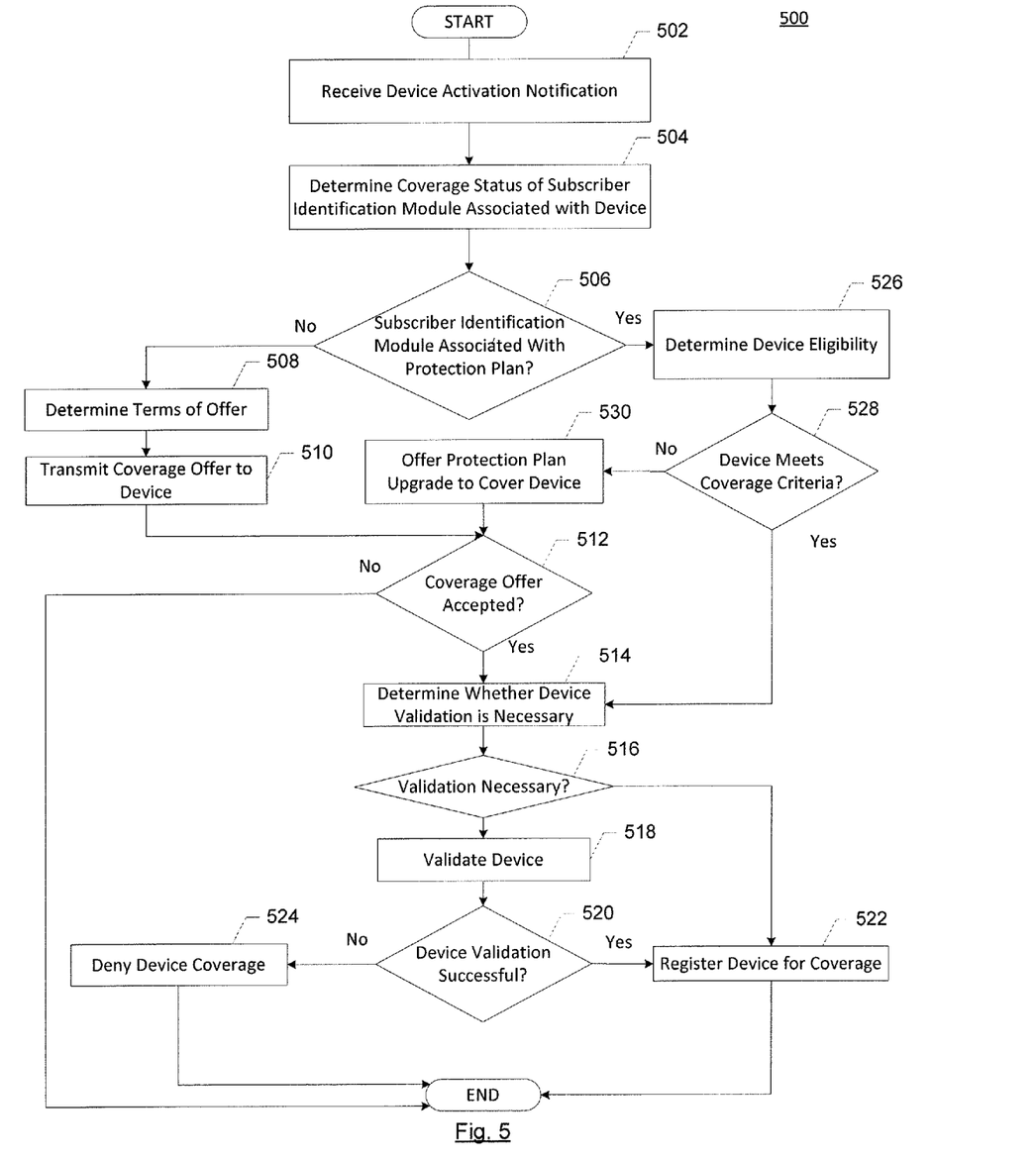

FIGS. 4-5 show example methods, namely processes 400, and 500 that may be executed by one or more machines (some examples of which are discussed in connection with FIGS. 1-3), in accordance with some embodiments discussed herein. These processes may be performed by computing devices as known in the art and described above with respect to FIGS. 1-3.

FIG. 4 depicts an example process 400 for providing wireless device protection based on a subscriber identification module from the perspective of a wireless device. It should be appreciated that the process of providing wireless device protection may require communication between a wireless device (e.g., the wireless device 104 described with respect to FIGS. 1 and 3) and a device protection manager (e.g., the device protection manager 102 described with respect to FIGS. 1 and 2). Embodiments of the process 400 describe how a wireless device may perform a method in communication with the device protection manager to determine whether a subscriber identification module is associated with a protection plan, to associate the wireless device with the protection plan if so, and to offer a protection plan to the user if not. The process 400 may be performed by various processing means and apparatuses, such as the wireless device 104 and/or the processing circuitry 302 described with respect to FIG. 3.

At action 402, the process detects a change in the subscriber identification module. This change may be a result of the owner of the wireless device inserting a new subscriber identification card. For example, a user may purchase a new wireless device and wish to associate the wireless device with an account the user has with a particular wireless network provider. To do so, the user may remove a SIM card from their previous wireless device and insert the SIM card into the new device. Alternatively, the change in the subscriber identification module may be a result of the user purchasing a new SIM card. In some embodiments, the user may purchase the SIM card and the wireless device simultaneously. As noted above, although examples are given with respect to processing of the protection plan using the wireless device, alternative embodiments may relate to detection of a simultaneous purchase of a wireless device and a subscriber identification module using a merchant POS. It should be readily appreciated how certain aspects of the process 400 could be performed by a merchant POS instead of the wireless device. For example, the merchant POS could be employed to sign the user up with a protection plan to be associated with the subscriber identification module at the time the subscriber identification module is purchased.

At action 404, the subscriber identification module is used to register the wireless device with a network. The registration process may include any processes or steps used to activate and/or authenticate the wireless device for use on a network, such as a cellular network. The registration process may include association of the wireless device with a particular user account identified by the subscriber identification module, such that the wireless device can be used to communicate on the network. This process may further include association of the wireless device with a particular telephone number, subscriber account name, or the like. In some embodiments, registration is performed in communication with a device protection manager, and registration of the wireless device is employed as a trigger to initiate the process of determining whether the wireless device is covered under a protection plan.

At action 406, a determination is made as to whether the subscriber identification module is associated with a protection plan. This determination may be made by a device protection manager and transmitted to the wireless device. For example, upon inserting the subscriber identification card to the wireless device, the wireless device may notify the device protection manager of an identifier of the subscriber identification module (e.g., an integrated circuit card identifier (IC-CID)). This identifier may be used to look up the subscriber identification module in a database to determine if the subscriber identification module is associated with a protection plan. The results of this query may be transmitted to the wireless device for determining how to proceed from action 406. If the subscriber identification module is not associated with a protection plan, the process proceeds to action 408. If the subscriber identification module is associated with a protection plan, the process proceeds to action 424.

At action 408, the wireless device receives an offer of a protection plan. The protection plan offered may be tailored to the particular user and/or particular wireless device. For example, the device protection manager may determine the model of the wireless device, and identify one or more protection plans to cover that particular model of device. Additionally or alternatively, this coverage may extend to the subscriber identification module, allowing the coverage to follow the subscriber identification module if/when the user replaces the wireless device. The price of the protection plan may be determined based on a variety of factors, including but not limited to the user's credit history, any previous claims made by the user, protection options selected by the user, the particular wireless device to be protected, the user's prior history with the insurer, whether the user has any other insurance policies with the insurer, and the like. For example, a price of the protection plan may be determined based at least in part on the replacement cost of the wireless device.

At action 410, a determination is made as to whether the user accepted the protection plan offered at action 408. If the user does not accept the coverage plan, the process ends without further action. In some embodiments, declining the coverage may flag the particular wireless device or the subscriber identification module as declining coverage, such that the user is not provided with any further prompts to purchase coverage.

If the user accepts the coverage offer, the process 400 proceeds to action 412. At action 412, a notification that the user accepted the coverage is transmitted to the device protection manager and validation requirements are received from the device protection manager in response to sending the acceptance. The validation requirements may indicate whether or not the wireless device must go through a validation process prior to enablement of the protection plan to cover the wireless device. This validation process may include verification of the functionality of the wireless device to ensure the device is in working order before beginning coverage. This process may be necessary to ensure that the user is not able to submit a claim for damage that existed prior to the user's purchase of the protection plan coverage.

At action 414, a determination is made as to whether validation is necessary. If validation requirements for the wireless device indicate that no validation is necessary (e.g., the device is being purchased as new at the same time coverage is requested, so the device is assumed to be in good working order, or the user has excellent credit history), then the process proceeds to action 422 where confirmation of the device being registered with the protection plan is received. If validation is necessary, the process proceeds to action 416 to validate the device.

At action 416, the device is validated. As noted above with respect to FIGS. 1-3, validation may be performed by an application executing on the wireless device, stored on the subscriber identification module, or the like. The validation process may include verification that the device is in working order by testing various features of the device, including but not limited to verifying that the wireless device is capable of sending and receiving calls, that the microphone and speakers are functional, that the display is functional, or the like. For example, to verify that the screen is functional, the user may be prompted to input numerical codes displayed in various areas of the display screen of the wireless device. Validation may further include capturing various information about the wireless device, including but not limited to the model of the device, the international mobile equipment identifier of the device, whether the device has been "jail broken" or otherwise had its security bypassed, the wireless device's phone number, whether the user has previously declined coverage, or the like.

At action 418, a determination is made as to whether validation was successful. If validation was successful, then the process proceeds to action 422 where a notification of the successful registration of the device is received. Otherwise, the process proceeds to action 420. At action 420, the user is notified of the denial based on the failure of the validation process. It should be appreciated that failure of validation may not always lead to an outright denial of coverage. For example, in some embodiments, if the wireless device fails validation, the user may be permitted to bring the wireless device to an authorized service center to verify that the device is in good working order. At that point, the user may be provided with an override code or the service center may be permitted to override the failed validation to obtain coverage of the device under the protection plan. In some embodiments, a device that cannot be validated or has not yet been validated may still be provided with some form of coverage. For example, the wireless device may be covered under the plan, but a waiting period may be applied before coverage begins or before a claim may be submitted. This waiting period may advantageously reduce the risk of false or erroneous claims by prevent consumers from activating coverage only after damage has occurred to the wireless device. In some embodiments, coverage for the device may begin immediately as soon as the device is confirmed to be eligible for coverage, and the validation process may function to reduce or eliminate the waiting period, rather than as a gating mechanism to begin coverage.

If validation is successful or unnecessary, the wireless device is registered with the protection plan at action 422. Registration of the wireless device allows the wireless device to be the subject of a future claim made by the user under the protection plan. The claims available to users may vary based on the terms of the particular protection plan offered to the user. For example, the user may be permitted to choose various options for the protection plan which have an impact on the premium charged for the plan. These options may include coverage for theft, loss, manufacturer's defect, accidental damage, screen coverage, technical support, deductible amount, or the like.

Returning to action 406, if the subscriber identification module is associated with a protection plan, the process proceeds to action 424, at which time a notification is received from the device protection manager indicating whether the wireless device is eligible for coverage under the protection plan associated with the subscriber identification module.

At action 426, if the notification received at action 424 indicates that the device is eligible under the plan, the process proceeds to action 414 to determine whether validation is necessary. However, if the device is not eligible under the user's protection plan (e.g., the user's protection plan only supports devices up to a certain price, which is less than the value of the wireless device), the process proceeds to action 428. At action 430, an offer to extend the user's protection plan to the otherwise ineligible wireless device is received. In this manner, the user may be provided with the opportunity to upgrade their protection plan to cover the wireless device. As with the offer described with respect to action 408, the terms, conditions, and costs of the offer received at action 426 may be dependent upon a variety of factors.

At action 430, a determination is made as to whether the user accepts the offer to upgrade the coverage of the protection plan to cover the wireless device. If the user accepts the offer of upgraded coverage to cover the wireless device, the process proceeds to action 432. Otherwise, the process ends without providing coverage on the device. Alternatively, in some embodiments partial coverage may be available for some devices, such as coverage in the amount previously associated with the subscriber identification module, even if such coverage is insufficient to completely cover the replacement or repair cost of the wireless device.

At action 432, notification of acceptance of the offer is transmitted to the device protection manager and validation requirements are received in response. The process then proceeds to action 414 to perform validation, if necessary. The process ends after either coverage is declined by the user, denied by the device protection manager, or the device is registered for coverage in association with the user's subscriber identification module.

FIG. 5 depicts an example process 500 for providing wireless device protection based on a subscriber identification module from the perspective of a device protection manager. It should be appreciated that the process of providing wireless device protection may require communication between a wireless device (e.g., the wireless device 104 described with respect to FIGS. 1 and 3) and a device protection manager (e.g., the device protection manager 102 described with respect to FIGS. 1 and 2). Embodiments of the process 500 describe how a device protection manager can determine whether a subscriber identification module associated with the wireless device is associated with a protection plan, and determine eligibility of the wireless device based on the subscriber identification module and other information relating to the wireless device. The process 500 may be performed by various processing means and apparatuses, such as the device protection manager 102 and/or the processing circuitry 202 described with respect to FIG. 2.

At action 502, a notification of the activation of the wireless device is received. This activation may include association of the wireless device with a particular subscriber identification module, such as a SIM card. Activation may include enabling the wireless device to communicate via a network, such as enabling a cellular device to make and receive calls via a network in response to verifying a SIM card associated with the wireless device is associated with an authorized user account. Activation of the wireless device may include providing information regarding a subscriber identification module to the device protection manager.

At action 504, an identifier associated with the subscriber identification module is examined to determine whether the subscriber identification module is associated with a protection plan. For example, a database or other data structure containing subscriber identifiers that have a valid protection plan may be examined to determine whether the subscriber identification module is associated with a protection plan. The database or data structure may further include information indicating options, features, and limits of the coverage of the protection plan which may be employed later in the process 500.

At action 506, the process branches depending upon whether the subscriber information module is associated with a protection plan. If the subscriber information module is not associated with a protection plan, the process proceeds to action 508 whereby a plan offer is determined and presented to the wireless device. If the subscriber information module is associated with a protection plan, the process proceeds to action 526 to determine whether the wireless device is eligible for coverage under the protection plan.

At action 508, terms of an offer for a protection plan are determined. The terms of the offer may include various coverage options and parameters that are selectable by the consumer, with different premium values for the different coverage options and parameters. For example, the price of loss or theft replacement coverage may differ based on a selected deductible, the replacement cost of the wireless device, and the user's claim history. Similarly, more comprehensive coverage may be more expensive than less comprehensive coverage, such that a user will be charged more if they request coverage for loss, theft, and accidental damage as opposed to coverage only for theft, and coverage with a higher deductible may be less expensive than coverage with a lower deductible.

At action 510, the terms of the offer are transmitted to the wireless device for the user to accept or decline. At action 512, a determination is made as to whether the user has accepted or declined. If a notification of acceptance is received, the process proceeds to action 514 to determine whether device validation is necessary. If coverage is declined, the process ends with no coverage being applied to the wireless device.

At action 514, a determination is made as to whether validation is necessary. As described above, validation may ensure the wireless device is in good working order at the time coverage begins in order to reduce the possibility of erroneous or fraudulent claims made for damage or loss that occurred prior to the beginning of coverage. If the process can verify that the device is in good working order (e.g., the coverage is being applied for at the time of device purchase), then no validation may be required. Similarly, if the device has recently been validated within a particular period of time, such as in the case where the user frequently switches wireless devices (e.g., the user has two devices and swaps a SIM card between the two), then another validation may not be necessary. At action 516, the process branches depending upon whether validation is necessary. If validation is necessary, the process proceeds to action 518 to validate the device. If validation is not necessary, the process proceeds to action 522 where the device is registered for coverage with the protection plan associated with the subscriber identification module.

As described above, if validation is necessary, at action 518 the wireless device may be validated to ensure the wireless device is functional. Validation may include receiving the results of a validation operation performed by an application executing on the wireless device. Alternatively, validation of the device may involve receiving information from the wireless device and processing the information to determine whether the wireless device is functional by the device protection manager. For example, the device protection manager may request the results of various diagnostics or other information from the wireless device. Alternately, the device protection manager may employ various other methods of verifying functionality of the wireless device. For example, the device protection manager may attempt to call the wireless device and request the user enter a particular numerical sequence to verify functionality of the device speaker, keypad, and ability to receive a call. Similarly, functionality of the device display may be verified by requesting the user to input codes displayed at various locations on the device display screen. This validation may be performed in conjunction with an application or hardware of the device, such as the protection service report 110 described with respect to FIG. 1 or the validation module 316 described with respect to FIG. 3.

In some embodiments, validation of the wireless device may include imposition of a "waiting period" whereby no claims may be submitted on the wireless device until a certain time period has passed. For example, the wireless device may not have protection services enabled for a period of 3 days or one week to reduce the chance for false, fraudulent, or erroneous claims. In some embodiments, this waiting period may be waived upon successful validation of the functioning of the wireless device. In some embodiments, other factors may be considered when determining whether to waive the waiting period, including but not limited to a user credit history, the user's history of making claims under the protection plan, the historical reliability of the particular wireless device, or the like.

At action 520, the process branches depending upon the success of the validation operation. If validation was successful, the process proceeds to action 522 to register the device with the protection plan associated with the subscriber identification module. In some embodiments, registration of the wireless device may revoke registration for other wireless devices with the same subscriber identification module, in order to ensure that the user is only provided with coverage on a single device at a time. At action 524, if the validation process fails, then coverage may be denied. As noted above with respect to FIG. 4, failure of the validation process may not be a final disposition, and the user may still be presented with the opportunity to verify the functionality of the wireless device by other methods in order to qualify for coverage under the protection plan.

Returning to action 506, if a protection plan is associated with the subscriber identification module, the process proceeds to action 526 whereby the eligibility of the particular wireless device is determined for the protection plan associated with the subscriber identification module. As noted above, not all plans may cover all devices, such that the user may need to upgrade their protection plan if the plan associated with the subscriber identification module does not support the wireless device. Additionally, some protection plans may offer certain coverage options for some devices but not others.

Determination of device eligibility may be performed by requesting an device identifier, such as an IMEI number for the device or a device model number to determine whether the device is covered. In this manner, embodiments of the process ensure that the coverage level purchased by the user is sufficient to cover the device, preventing the user from obtaining cheap coverage on a low end device and then swapping the subscriber identification module to an expensive, high end device without a commensurate increase in premiums.

At action 528, if the device meets the coverage criteria (e.g., the replacement price of the device is within the coverage limits of the protection plan), then the process proceeds to action 514 to determine if validation is necessary, after which the remainder of the process executes as described above. If the device does not meet the coverage criteria, then the process proceeds to action 530, where an offer is made to increase the coverage of the protection plan to cover the wireless device. This offer may include different coverage options (e.g., not all coverage levels may be available for all devices) for the wireless device than the coverage options previously associated with the subscriber identification module. Acceptance or denial of this new offer is determined at action 512, after which the process proceeds as with respect to a new coverage registration offer.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as the processor 202 and 302, as discussed above with reference to FIGS. 2 and 3, to produce a machine, such that the computer program product includes the instructions which execute on the computer or other programmable data processing apparatus create a means for implementing the functions specified in the flowchart block or blocks.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as the processor 202 and 302, as discussed above with reference to FIGS. 2 and 3, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., the memory 204, 304) that can direct a computer or other programmable data processing apparatus to function in a particular manner, such that the instructions stored in the computer-readable storage device produce an article of manufacture including computer-readable instructions for implementing the functions discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing wireless device protection services comprising:

receiving, from a first wireless device, a subscriber identifier associated with a wireless device subscriber identification module;

determining, using a processor, whether the subscriber identifier is associated with a wireless device protection plan;

in response to determining that the subscriber identifier is associated with the wireless device protection plan, determining whether the first wireless device is eligible for the wireless device protection plan;

in response to determining that the first wireless device is eligible for the wireless device protection plan, registering the first wireless device with the wireless device protection plan to provide services associated with the wireless device protection plan for the first wireless device;

receiving a notification that the subscriber identification module is associated with a second wireless device; and registering the second wireless device with the wireless device protection plan to provide the services of the wireless device protection plan for the second wireless device.

2. The method of claim 1, wherein determining whether the first wireless device is eligible for the wireless device protection plan comprises determining whether a device model of the first wireless device is eligible for protection by the services of the wireless device protection plan.

3. The method of claim 2, further comprising:
determining that the device model of the first wireless device is not eligible for protection by the services of the wireless device protection plan;
in response to determining that the device model of the first wireless device is not eligible for protection under the wireless device protection plan, providing a prompt to the first wireless device to upgrade the wireless device protection plan such that the device model of the first wireless device is eligible for protection by the services of the wireless device protection plan; and
in response to receiving a confirmation of an intention to upgrade the wireless device protection plan, upgrading the wireless device protection plan to provide the services of the wireless device protection plan for the first wireless device.

4. The method of claim 1, further comprising verifying that the second wireless device is eligible for the wireless device protection plan prior to registering the second wireless device with the wireless device protection plan.

5. The method of claim 1, further comprising revoking the registration of the first wireless device in response to registering the second wireless device.

6. The method of claim 1, further comprising validating the functionality of the first wireless device prior to registering the wireless device with the wireless device protection plan.

7. The method of claim 6, further comprising:
in response to a failure of validation of the first wireless device, imposing a waiting period on the wireless device protection plan such that at least a portion of the services associated with the wireless device protection plan are unavailable until expiration of the waiting period.

8. The method of claim 6, wherein validating the functionality comprises at least one of verifying the functionality of a display of the first wireless device, a microphone of the first wireless device, a keypad of the first wireless device, a touchscreen of the first wireless device, a speaker of the first wireless device, or the ability of the first wireless device to receive a call.

9. The method of claim 1, wherein the subscriber identification module is a Subscriber Identity Module (SIM) card.

10. The method of claim 1, wherein the wireless device protection plan is at least one of a device warranty, a device insurance policy, or a device technical support plan.

11. An apparatus for providing wireless device protection services, the apparatus comprising at least one processor coupled to a memory, the memory comprising computer executable instructions that, when executed by the processor, configure the apparatus to:
receive, from a first wireless device, a subscriber identifier associated with a wireless device subscriber identification module;
determine whether the subscriber identifier is associated with a wireless device protection plan;
in response to determining that the subscriber identifier is associated with the wireless device protection plan, determine whether the first wireless device is eligible for the wireless device protection plan;
in response to determining that the first wireless device is eligible for the wireless device protection plan, register the first wireless device with the wireless device protection plan to provide services associated with the wireless device protection plan for the first wireless device;
receive a notification that the subscriber identification module is associated with a second wireless device; and
register the second wireless device with the wireless device protection plan to provide the services of the wireless device protection plan for the second wireless device.

12. The apparatus of claim 11, wherein determining whether the first wireless device is eligible for the wireless device protection plan comprises determining whether a device model of the first wireless device is eligible for protection by the services of the wireless device protection plan.

13. The apparatus of claim 12, further configured to:
determine that the device model of the first wireless device is not covered by the wireless device protection plan;
in response to determining that the device model of the first wireless device is not eligible for protection by the services of the wireless device protection plan, provide a prompt to the first wireless device to upgrade the wireless device protection plan to cover the wireless device; and
in response to receiving a confirmation of an intention to upgrade the wireless device protection plan, upgrade the wireless device protection plan to provide the services of the wireless device protection plan for the first wireless device.

14. The apparatus of claim 11, further configured to verify that the second wireless device is eligible for the wireless device protection plan prior to registering the second wireless device with the wireless device protection plan.

15. The apparatus of claim 11, further configured to revoke the registration of the first wireless device in response to registering the second wireless device.

16. The apparatus of claim 11, further configured to validate the functionality of the first wireless device prior to registering the wireless device with the wireless device protection plan.

17. The apparatus of claim 16, wherein validating the functionality comprises at least one of verifying the functionality of a display of the first wireless device, a microphone of the first wireless device, a keypad of the first wireless device, a touchscreen of the first wireless device, a speaker of the first wireless device, or the ability of the first wireless device to receive a call.

18. A non-transitory computer readable storage medium comprising instructions that, when executed by a processor, configure the processor to:
- receive, from a first wireless device, a subscriber identifier associated with a wireless device subscriber identification module;
- determine whether the subscriber identifier is associated with a wireless device protection plan;
- in response to determining that the subscriber identifier is associated with the wireless device protection plan, determine whether the first wireless device is eligible for the wireless device protection plan;
- in response to determining that the first wireless device is eligible for the wireless device protection plan, register the first wireless device with the wireless device protection plan to provide services associated with the wireless device protection plan for the first wireless device;
- receive a notification that the subscriber identification module is associated with a second wireless device; and
- register the second wireless device with the wireless device protection plan to provide the services of the wireless device protection plan for the second wireless device.

19. The computer readable storage medium of claim 18, the instructions further configuring the processor to activate the first wireless device on a wireless network using an authentication credential provided by the subscriber identification module.

20. The computer readable storage medium of claim 18, wherein the wireless device protection plan is at least one of a device warranty, a device insurance policy, or a device technical support plan.

21. The computer readable storage medium of claim 18, the instructions further configuring the processor to validate functionality of the first wireless device, and wherein coverage of the first wireless device under the wireless device protection plan is further received in response to a successful validation of the functionality of the first wireless device.

22. The computer readable storage medium of claim 18, wherein registering the second wireless device under the wireless device protection plan further comprises a revocation of a registration of the first wireless device under the wireless device protection plan.

23. A method for providing wireless device protection services comprising:
- receiving, from a first wireless device, a subscriber identifier associated with a wireless device subscriber identification module;
- determining, using a processor, that the subscriber identifier is associated with a wireless device protection plan;
- determining that a second wireless device other than the first wireless device is registered with the wireless device protection plan;
- registering the first wireless device with the wireless device protection plan to provide services associated with the wireless device protection plan for the first wireless device; and
- revoking registration of the second wireless device with the wireless device protection plan, wherein the subscriber identifier is received in response to activation of the subscriber identification module with the first wireless device to enable the first wireless device to access a wireless network, and wherein the subscriber identification module was previously activated with the second wireless device to enable the second wirless device to access the wireless network.

* * * * *